United States Patent
Itoh et al.

(10) Patent No.: US 7,430,219 B2
(45) Date of Patent: Sep. 30, 2008

(54) METHOD FOR TRANSPORTING MEDIA, TRANSMITTER AND RECEIVER THEREFOR

(75) Inventors: Tomoaki Itoh, Kanagawa (JP); Takao Yamaguchi, Tokyo (JP); Harumine Yoshiba, Kanagawa (JP); Naoyuki Otoshi, Kanagawa (JP); Manabu Nakamura, Tokyo (JP); Junichi Hamada, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1103 days.

(21) Appl. No.: 10/456,452

(22) Filed: Jun. 6, 2003

(65) Prior Publication Data
US 2003/0231589 A1    Dec. 18, 2003

(30) Foreign Application Priority Data
Jun. 14, 2002  (JP)  ............................. 2002-174691

(51) Int. Cl.
*H04J 3/16*   (2006.01)
*H04L 12/56*  (2006.01)
(52) U.S. Cl. ..................... 370/465; 370/230; 370/235
(58) Field of Classification Search ............. 370/230
See application file for complete search history.

(56) References Cited

U.S. PATENT DOCUMENTS

| | | | | |
|---|---|---|---|---|
| 5,297,139 | A * | 3/1994 | Okura et al. ............... | 370/428 |
| 5,892,881 | A * | 4/1999 | Takishima et al. .......... | 386/52 |
| 6,269,078 | B1 * | 7/2001 | Lakshman et al. .......... | 370/230 |
| 6,650,787 | B1 * | 11/2003 | Takahashi et al. ........... | 382/251 |
| 6,671,257 | B1 * | 12/2003 | Soumiya et al. ........... | 370/230.1 |
| 6,754,189 | B1 * | 6/2004 | Cloutier et al. ............ | 370/329 |
| 6,782,490 | B2 * | 8/2004 | Maxemchuk et al. ......... | 714/18 |
| 6,996,624 | B1 * | 2/2006 | LeCroy et al. .............. | 709/231 |
| 7,187,647 | B1 * | 3/2007 | Gerakoulis et al. .......... | 370/208 |
| 2001/0047423 | A1 * | 11/2001 | Shao et al. .................. | 709/235 |

(Continued)

FOREIGN PATENT DOCUMENTS

EP  1 168 701 A2  1/2002

(Continued)

OTHER PUBLICATIONS

H. Schulzrinne et al. "RTP: A transport Protocol for Real-Time Applications"; RFC 1889; Internet Engineering Taskforce; Jan. 1996.

(Continued)

*Primary Examiner*—Rafael Pérez-Gutiérrez
*Assistant Examiner*—German Viana Di Prisco
(74) *Attorney, Agent, or Firm*—Harness, Dickey & Pierce, P.L.C.

(57) ABSTRACT

When a transport rate Rs is updated, in the case where the updated transport rate Rs is within a variable range (Rc<Rs<U×Rc, and U>1) defined by a current encoding rate Rc, FEC (Forward Error Correction) data sending rate Rf is updated (Rf=Rs−Rc) without updating the current encoding rate Rc. On the other hand, in the case where an Rc update timer set to three seconds, for example, is timed out, the encoding rate Rc is updated using a minimum value Rs_min of the transport rate up to that time (Rc=V×Rs_min, and 0<V<1). Even when the transport rate Rs greatly varies to be out of the variable range, the encoding rate Rc is updated in the same manner.

8 Claims, 8 Drawing Sheets

U.S. PATENT DOCUMENTS

| | | | |
|---|---|---|---|
| 2001/0048709 A1 | 12/2001 | Hoffmann et al. | |
| 2003/0041165 A1* | 2/2003 | Spencer et al. | 709/233 |
| 2003/0074674 A1* | 4/2003 | Magliaro | 725/118 |
| 2003/0166394 A1* | 9/2003 | Tsien et al. | 455/67.1 |
| 2005/0249211 A1* | 11/2005 | Chou et al. | 370/389 |
| 2006/0156185 A1* | 7/2006 | Zhang et al. | 714/758 |

FOREIGN PATENT DOCUMENTS

| | | |
|---|---|---|
| EP | 1 202 487 A2 | 5/2002 |
| EP | 1202487 A2 * | 5/2002 |
| JP | 09172642 A | 6/1997 |
| JP | 11-284659 | 10/1999 |
| JP | 2000092064 A | 3/2000 |
| JP | 2001-144802 | 5/2001 |
| JP | 2001211452 A | 8/2001 |
| JP | 2001230809 A | 8/2001 |
| JP | 2002118598 A | 4/2002 |

OTHER PUBLICATIONS

J. Rosenberg et al.; "An RTP Payload Format for Generic Forward Error Correction"; RFC 2733; Internet Engineering Taskforce; Dec. 1999.

M. Handley et al.; "TCP Friendly Rate Control (TFRC): Protocol Specification"; RFC 3448; Internet Engineering Taskforce; Jan. 2003.

European Search Report for Application No. EP 03 01 3554; Mailed Feb. 20, 2004.

* cited by examiner

METHOD FOR TRANSPORTING MEDIA, TRANSMITTER AND RECEIVER THEREFOR

BACKGROUND OF THE INVENTION

The present invention relates to a method for transporting audio/video data transmitted from a camera or a microphone, that is, media data with high quality, a transmitter and a receiver therefor.

Various connection modes are used over an IP (Internet Protocol) network, such as an intranet or the Internet. Depending on the connection mode, the usable bands of the network in terms of bit rate vary in a range of from several kilobits per second (kbps) to several hundreds of megabits per second (Mbps). In addition, the influence of other flows (transmission data) causes the usable band to vary in time. As such, transport rate control is necessary to perform media data transport across a network of the type described above. The transport rate control adjusts the transport rate in accordance with the usable transport bands.

Known protocols employed to transport media data across the Internet in real time include RTP (Realtime Transport Protocol)/RTCP (RTP Control Protocol) (H. Schulzrinne et al., "RTP: A Transport Protocol for Real-Time Applications", RFC 1889, Internet Engineering Taskforce, Jan. 1996). According to the RTP/RTCP, a reception terminal transmits feedback information regarding, for example, the packet loss rate, propagation delay time, and jitter, to a transmission terminal, and the transport rate is determined on the basis of the feedback information. The transmission interval (notification interval) for the feedback information from the reception terminal is a fixed value, for example, five seconds.

Known methods of transport rate control using feedback information as described above include a method called TFRC (TCP Friendly Rate Control) (M. Handley et. al., "TCP Friendly Rate Control (TFRC): Protocol Specification", RFC 3448, Internet Engineering Taskforce, Jan. 2003). According to the TFRC, the transport rate is controlled to increase until a packet loss event occurs, and the transport rate is controlled to decrease when the packet loss event has occurred. Thereby, TFRC enables update to be smoothly achieved for producing a transport rate suitable for intended media data transmission. The transport rate update interval is 1×RTT (Round Trip Time), ranging from several tens of milliseconds (ms) to several hundreds of milliseconds (ms), for example.

Another known method is a method described in Request for Comments (RFC) 2733 (J. Rosenberg et al., "An RTP Payload Format for Generic Forward Error Correction", Internet Engineering Taskforce, Dec. 1999), which is a technique of imparting an error correction capability to RTP. More specifically, the RFC 2733 technique adds FEC data (FEC: forward error correction), which is redundant data for forward error correction, to data which is to be transmitted.

In the event of transmitting encoded data based on media data, when its transport rate is updated following the TFRC at intervals ranging from several tens of milliseconds (ms) to several hundreds of milliseconds (ms), and the encoding rate is updated every time the transport rate is updated, the encoding rate frequently varies. As such, for example, quality of images to be transmitted frequently varies, resulting in deteriorating view image quality.

In addition, when the notification interval for feedback information from a reception terminal to a transmission terminal is set short, an advantage is exhibited in that a usable transmission band can quickly be accessed, and the transmission band can be efficiently used. On the other hand, the update frequency for the transport rate in the transmission terminal is rendered high, and quality of media data is frequently varied to an extent that the media transport cannot be implemented maintaining stable quality. In addition, the degree of fairness in throughput with respect other flow is reduced. Conversely, with the notification interval for the feedback information is set long, the update frequency for the transport rate is reduced. In this case, while the transport rate is stabilized, variations in the transmission band cannot be followed, thereby disabling efficient use of the transmission band. Further, in the case where the notification interval is set long, when the usable transmission band is narrow, packets are lost in a burst-wise manner, and media data transmission quality is extremely deteriorated.

Moreover, conventionally, since the data packet size is uniform, when the transport rate is reduced, the number of the packets is reduced. Generally, in a reception terminal, a packet loss rate L is calculated by the following equation:

$L = 1 -$ (number of data packages arrived at a reception terminal within a time $T$)/(number of data packages transmitted from a transmission terminal whithin the time $T$)

Ordinarily, the time T is a time interval from the instant of transmission of previous feedback information to the instant of transmission of current feedback information. The equation describes that as the number of packets to be transported from the transmission terminal decreases, the packet loss of one packet causes the packet loss rate to be greatly vary. For example, assume a state where the transport rate significantly decreases, and no more than one packet can be transported within the time T. In this state, when the packet is not lost, the packet loss rate is 0%; whereas, when the packet is lost, the packet loss rate is 100%. In such the state, for the reason that an accurate network congestion state cannot secured for the reason that the packet loss rate cannot finely be observed.

Further, in a method represented by TFRC and placing primary importance on the fairness with respect to the TCP, The RTT is included in a denominator of a calculation expression that determines the transport rate. The RTT is a time required for the round trip of a packet between a transmission terminal and a reception terminal; as such it can take a value 1 ms or less when the distance between the transmission terminal and the reception terminal is short. In this state, the RTT measurement result is influenced by various delay fluctuations irrelevant to the network congestion state. For example, the delay fluctuations include a delay fluctuation in processing of an operating system that performs processing for packet transmission from the transmission terminal, and a delay fluctuation in transfer processing of a router that performs packet transfer processing.

SUMMARY OF THE INVENTION

An object of the present invention is to implement high-quality media data transport under an environment in which a usable band greatly varies.

In order to achieve the object, the present invention is directed to suppression of frequent update events for encoding rates, adjustment of a notification interval for feedback information, change of the packet size, and addition of an offset to an RTT. Consequently, high-quality media data transport under an environment in which a usable band greatly varies can be implemented. Therefore, the present invention can be applied to various applications, such as a VoIP (Voice Over Internet Protocol) utilized for Internet telephones, a TV telephone, and monitoring/broadcasting utilizing a network.

More specifically, in transport of encoded data based on media data, the present invention is directed to update a transport rate in accordance with a transport state of the network and to update an encoding rate at a frequency lower than an update frequency for the transport rate. For example, when a timer set to a timeout period longer than an update interval for the transport rate is timed out or when the transport rate is updated to a value which is out of a predetermined range, the transport rate is updated in accordance with a minimum value of the transport rate within a time. In the case of adding redundant data for error correction to the encoded data, a difference between the transport rate and the encoding rate may be allocated to a sending rate for redundant data.

In addition, the present invention is directed to notify of feedback information indicative of a transport state of the network from a reception terminal at a variable interval in accordance with the transport state of the network and to update a transport rate for the media data in accordance with the notified feedback information. For example, a notification interval for the feedback information is shortened when a packet loss rate is high, and the notification interval for the feedback information is lengthened when the packet loss rate is low. Preferably, the notification interval of the feedback information is limited in such a manner that it is not shorter than a predetermined minimum interval.

Further, in transport of media data, the present invention is directed to change the data packet size to a small value when the transport rate is lowered and a predetermined number of packets is determined not to be transmittable within a packet-loss observation period. In order to precisely gain a congestion state of the network, the number of data packages to be sent from a transmission terminal within a predetermined period may be set to a predetermined number or more. It can be considered that the data packet size is preset small and the number of packets to be sent is increased. However, since a header is provided to the packet, a problem arises in that the overhead of the headers is increased when the number of packets is increased. As such, according to the present invention, an adoptive process is performed in such a manner that when the transport rate is high, the packet size is set to be large, and when the transport rate is lowered, the packet size is set to be small, whereby the observation accuracy for the packet loss rates is improved. Consequently, the packet loss rates can be finely observed, and accurate transport rates can be determined.

Further, the present invention is directed to add an offset to an RTT when the RTT is smaller than a predetermined value. Consequently, when the value of the RTT is excessively small, the transport rate can be prevented from being greatly influenced by fluctuation of a delay irrelevant to the congestion of the network.

DETAILED DESCRIPTION OF THE INVENTION

Hereinafter, embodiments of a method for transporting media, a transmitter and a receiver therefor according to the present invention with reference to the drawings.

Figure 1:
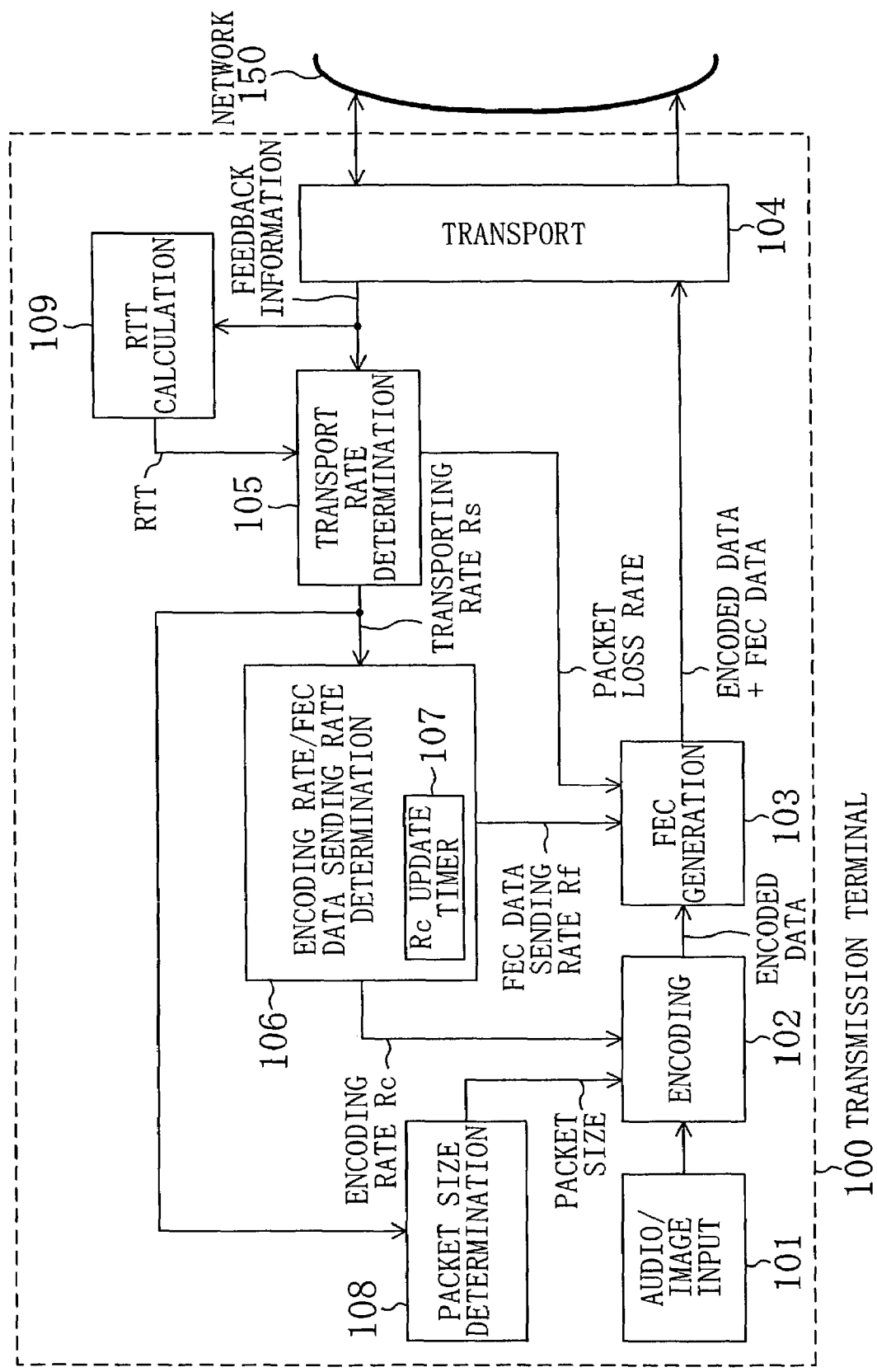
FIG. 1 is a block diagram showing an internal configuration example of a media transmitter (transmission terminal) according to the present invention.
Figure 2:
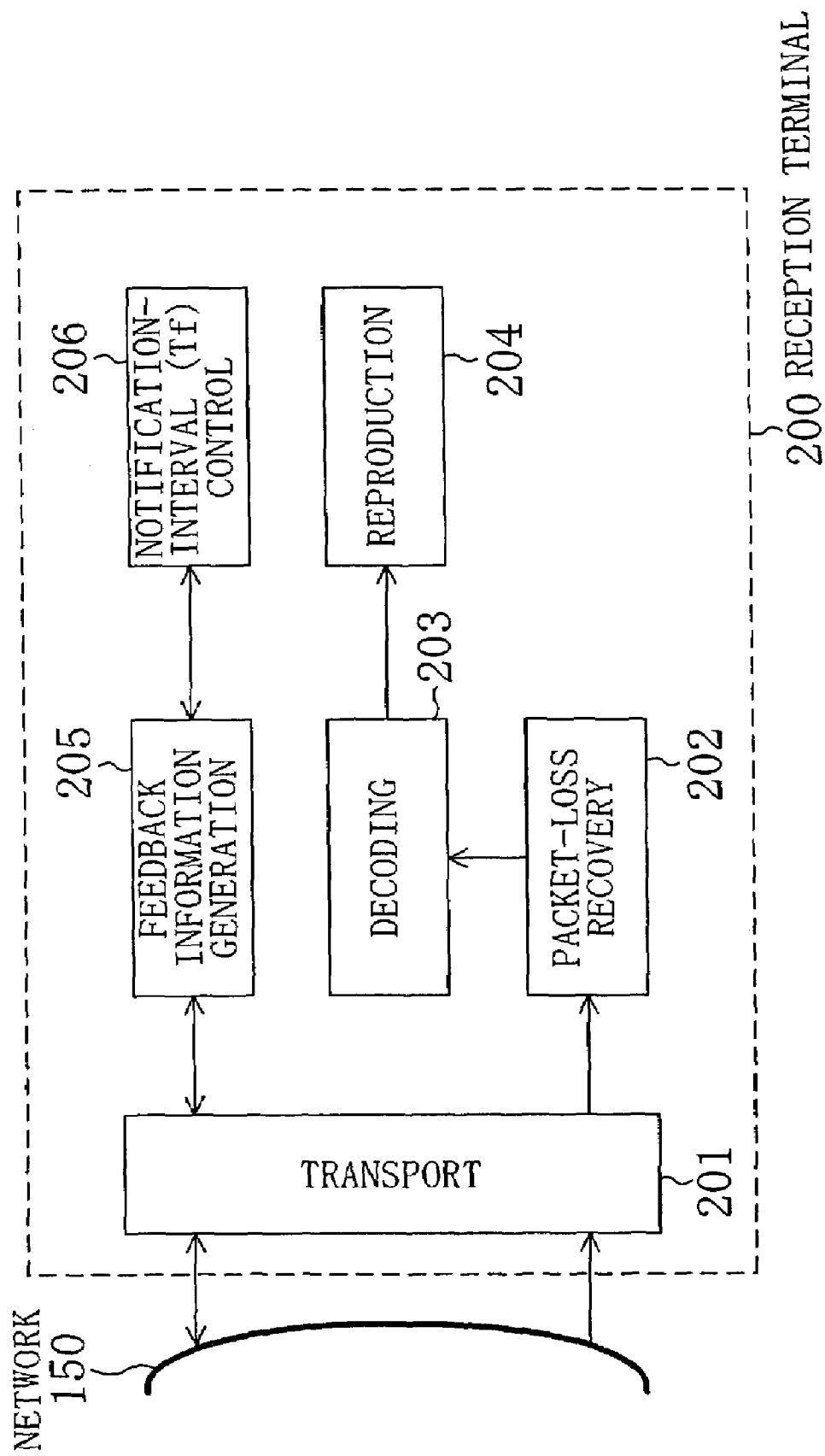
FIG. 2 is a block diagram showing an internal configuration example of a media receiver (reception terminal) according to the present invention.

FIGS. 1 and 2 show a configuration example of a media transport system for transporting encoded data based on media data. Specifically, FIG. 1 shows an internal configuration example of a media transmitter (transmission terminal) 100, and FIG. 2 shows an internal configuration example of a media receiver (reception terminal) 200. The transmission terminal 100 and the reception terminal 200 are connected together a network 150. The network 150 may be a wired network, a wireless network, or a network including alternately connected wired and wireless networks. The system employs, for example, the realtime transport protocol/realtime transport control protocol (RTP/RTCP) as transport protocols between the transmission terminal 100 and the reception terminal 200.

The transmission terminal 100 of FIG. 1 has a configuration including an audio/image input section 101, an encoding section 102, an FEC generation section 103, a transport section 104, a transport rate determination section 105, an encoding rate/FEC data sending rate determination section 106, a packet size determination section 108, and an RTT calculation section 109. The audio/image input section 101 is, for example, a camera or a microphone for inputting audio/video data (media data) to be encoded. The encoding section 102 generates encoded data from media data in accordance with a specified encoding rate Rc. For example, standardized compressing/encoding schemes, such as MPEG (Moving Picture Coding Experts Group) 1/2/4 and AMR (Audio/Modem Riser), may be employed. The encoding section 102 has the function of outputting data with a packet size determined by the packet size determination section 108. The FEC generation section 103 generates FEC data, which is redundant data for error correction, from encoded data in accordance with a specified FEC data sending rate Rf. The transport section 104 transmits the encoded data and the FEC data to the network 150 and transmits and receives control information to enable feedback information (such as packet loss rates, propagation delay times, and jitters) indicative of the transport state of the network 150 to be secured from the reception terminal 200. The transport rate determination section 105 updates a transport rate Rs in accordance with the feedback information and an RTT calculated by the RTT calculation section 109, and notifies the FEC generation section 103 of a packet loss rate. For example, a TFRC is employed as an algorithm for determining the transport rate Rs. The encoding rate/FEC data sending rate determination section 106 updates the encoding rate Rc at an update frequency lower than an update frequency for the transport rate Rs by using an Rc update timer 107, and allocates a difference between the transport rate Rs and the encoding rate Rc to the FEC data sending rate Rf. The packet size determination section 108 determines a packet size in accordance with the transport rate Rs notified from the transport rate determination section 105, and notifies the encoding section 102 of the determined result. The RTT calculation section 109 receives the feedback information from the transport section 104, and calculates a round trip propagation delay time (RTT), used for calculating the transport rate Rs, from the feedback information.

The reception terminal 200 of FIG. 2 has a configuration including a transport section 201, a packet-loss recovery section 202, a decoding section 203, a reproduction section 204, a feedback information generation section 205, and a notification interval control section 206. The transport section 201 receives the encoded data and the FEC data transported from the transmission terminal 100 via the network 150, and transmits and receives control information to enable the generation of feedback information indicative of a transport state of the network 150. The packet-loss recovery section 202 uses the FEC data to recover encoded data in a packet lost in the network 150. The decoding section 203 decodes the encoded data to secure media data. The reproduction section 204 is, for example, a display or a speaker for reproducing the decoded result. The feedback information generation section 205 generates feedback information indicative of the transport state of the network 150. The transport section 201 notifies the transmission terminal 100 of the generated feedback information via the network 150. The notification interval control section 206 controls a notification interval Tf of the feedback information in accordance with the transport state of the network 150.

Figure 3:
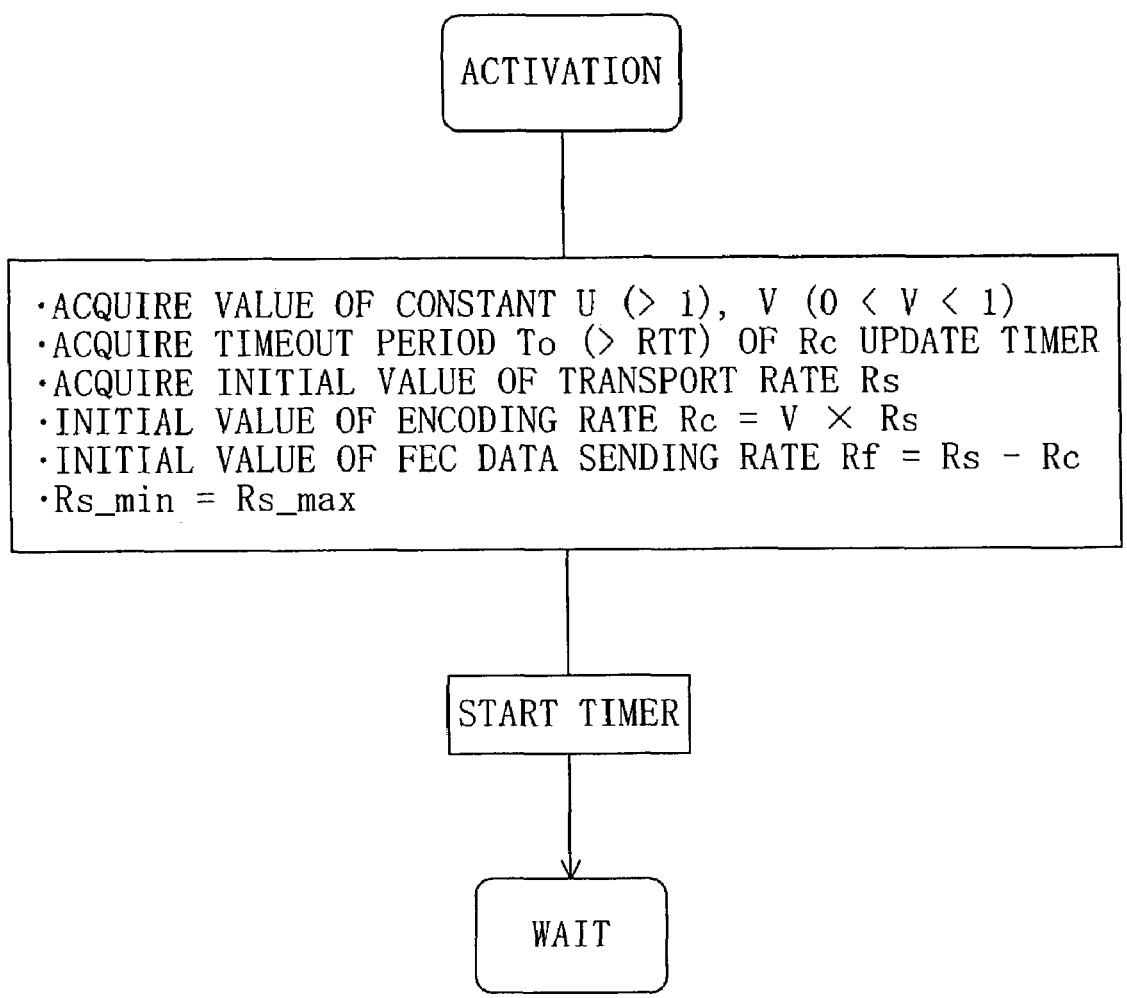
FIG. 3 is a flowchart showing an initial operation of an encoding rate/FEC data sending rate determination section shown in FIG. 1.

FIG. 3 shows an initial operation of the encoding rate/FEC data sending rate determination section 106 shown in FIG. 1. Upon activation of the transmission terminal 100, the encoding rate/FEC data sending rate determination section 106 first acquires values of constants U and V. The constant U is a value (U>1) for defining a narrow variable range of the transport rate Rs. The constant V is a value (0<V<1) used to control the encoding rate Rc not to exceed the transport rate Rs. Next, the encoding rate/FEC data sending rate determination section 106 acquires a timeout period To (longer than 1×RTT: three seconds, for example) and an initial value of the transport rate Rs. Subsequently, an initial value of the encoding rate Rc is set to V×Rs, and an initial value of the FEC data sending rate Rf is set to Rs−Rc. Then, a maximum transport rate Rs_max is set to a variable Rs_min, and the Rc update timer 107 is started, whereby the encoding rate/FEC data sending rate determination section 106 turns into a WAIT state (standby state). The Rs_min is a variable for acquiring the minimum value of the transport rate Rs within a time.

Figure 4:
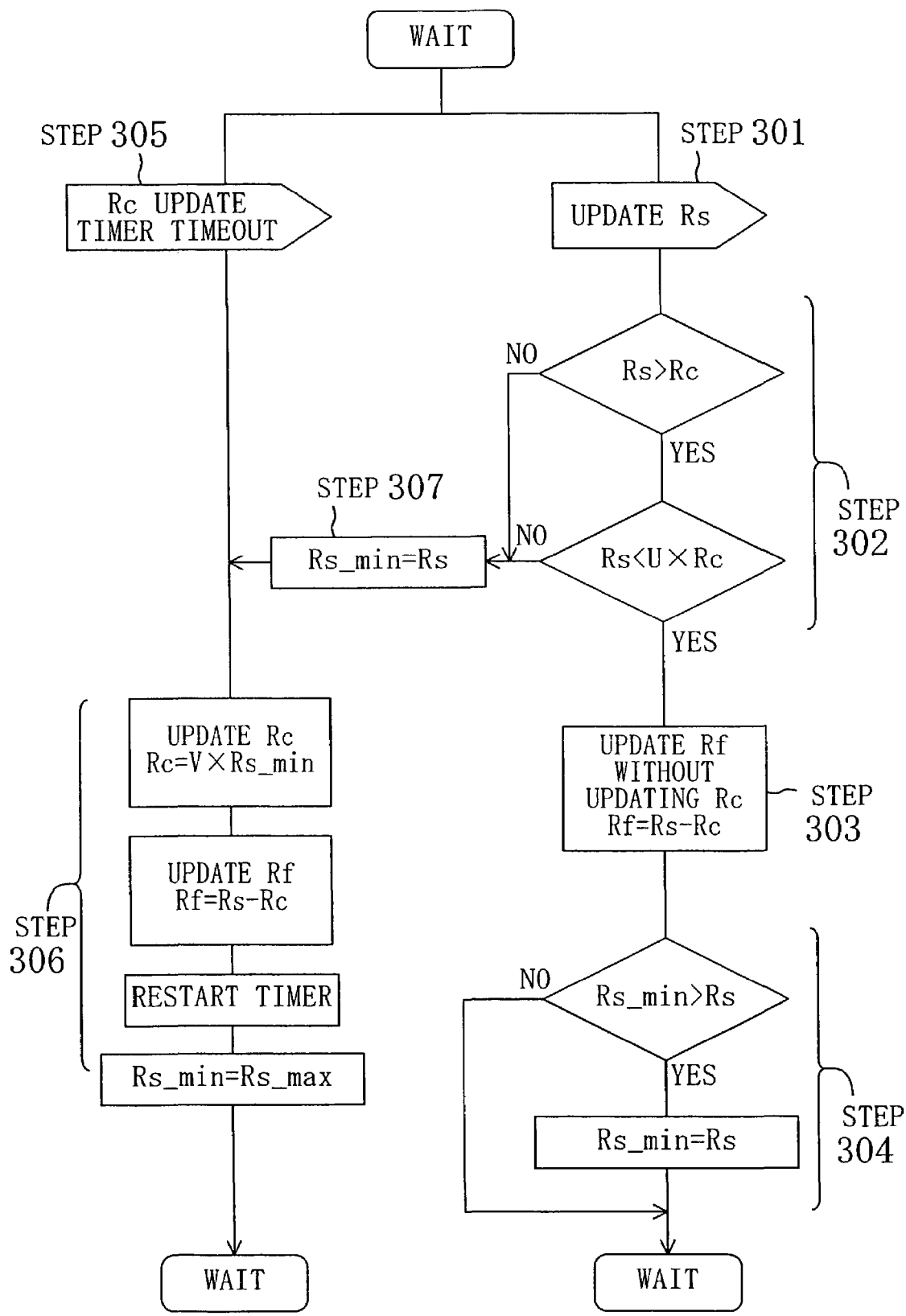
FIG. 4 is a flowchart showing an interrupt operation of the aforementioned determination section.

FIG. 4 shows an interrupt operation of the encoding rate/FEC data sending rate determination section 106 shown in FIG. 1. The instance when an interrupt occurs in the encoding rate/FEC data sending rate determination section 106 and causes the encoding rate/FEC data sending rate determination section 106 to leave the WAIT state occurs when the transport rate Rs is updated by the transport rate determination section 105 or when the Rc update timer 107 is timed out. The transport rate Rs is assumed to be updated by the transport rate determination section 105 following the TFRC every time feedback information is received from the reception terminal 200.

When an updated transport rate Rs is notified to the encoding rate/FEC data sending rate determination section 106 (step 301), it is checked whether the notified transport rate Rs is within a variable range (Rc<Rs<U×Rc) defined by the current encoding rate Rc (step 302). When the transport rate Rs is within the variable range, the encoding rate/FEC data sending rate determination section 106 updates an FEC data sending rate Rf in accordance with the notified transport rate Rs without updating the current encoding rate Rc (Rf=Rs−Rc: step 303). When the notified transport rate Rs is a minimum transport rate during a period from the activation of the Rc update timer 107, the encoding rate/FEC data sending rate determination section 106 preserves it into the variable Rs_min (step 304), and returns to the WAIT state.

When timeout of the Rc update timer 107 occurs (step 305), the encoding rate/FEC data sending rate determination section 106 updates the encoding rate Rc (Rc=V×Rs_min) using the value of the variable Rs_min in that state; updates the FEC data sending rate Rf in accordance with the current transport rate Rs and the updated encoding rate Rc (Rf=Rs−Rc); reactivates the Rc update timer 107; and sets the maximum transport rate Rs_max again to the variable Rs_min (step 306); and then returns to the WAIT state.

When the transport rate Rs is varied to be out of the variable range (Rc<Rs<U×Rc), the encoding rate/FEC data sending rate determination section 106 sets the notified transport rate Rs to the variable Rs_min (step 307); performs the operation in step 306 such as update of the encoding rate Rc; and then returns to the WAIT state.

Thus, the algorithm described above enables the update frequency for the encoding rate Rc to be suppressed and enables an appropriate FEC data sending rate Rf to be secured.

Next, an operation example of the FEC generation section 103 of FIG. 1 will be described. FEC data generation uses, for example, the XOR (exclusive-OR) operation specified in the RFC-2733. In brief, with fixed error tolerability being premised, FEC data is generated to enable the loss of, for example, two continuing packets, to be recovered. However, the error correction capability may be modified after detecting the number of continuously lost packets. When the amount of generated FEC data is smaller than the FEC data sending rate Rf determined according to the algorithm shown in FIGS. 3 and 4, the FEC data are all sent out. When the amount of FEC data is greater than the determined encoding rate Rc, the amount of the FEC data is adjusted. When the amount of FEC data to be sent out is too great, the amount of the FEC data may be reduced by lowering the error correction capability. In addition to the scheme using the XOR operation, a different error correction scheme, such as a Reed-Solomon or parity scheme, may be used.

Alternatively, the operation may be arranged such that a plurality of error correction schemes are employed to be dynamically switchable corresponding to the FEC data sending rate Rf and the packet loss rate. For example, the operation is arranged such that a high error tolerability of a combined pattern of Reed-Solomon and interleave schemes is selected when the packet loss rate is high, and a low error tolerability of a pattern such as a parity-scheme pattern is selected when the packet loss rate is low.

When the FEC-data sending rate Rf is higher than a threshold D2 (fixed value) during a predetermined period, the parity scheme with low error tolerability is used while the process amount of error correction operation is small. In contrast, when the FEC data sending rate Rf is lower than or equal to the threshold D2 during a predetermined period, the Reed-Solomon scheme with high error tolerability is used while the process amount of error correction operation is large. According to this arrangement, when the send-out amount of FEC data is large, the parity scheme is used to enable the processing load of the reception terminal 200 to be reduced. Concurrently, when the send-out amount of FEC data is small, the Reed-Solomon scheme is used to enable the error tolerability to be maintained high. Reducing the processing load of the reception terminal 200 provides advantages. For example, an increased amount of video data can be received from the transmission terminal 100; and in addition, since the processing delay is reduced, media-data reproduction can be implemented with a reduced delay.

In addition, the FEC generation section 103 may be arranged such that, for example, data to which error tolerabilities are added is selected, and the number of items of the data is determined in accordance with the packet loss rate. When the packet loss rate is high, the error tolerability is selectively imparted to data important for decoding, such as intraframes and video headers for video data and voice portions for audio data.

The above will be described below in more detail. For MPEG-2 video encoded data, when the packet loss rate is low, a scheme of adding FEC data to the entirety of the video encoded data (the scheme will be referred to as a scheme X). When the packet loss rate is high, a scheme is employed in which while FEC data is added only to I (Intra) and P (Predictive) frames, no FEC data is added to B (Bidirectionally predictive) frames (the scheme will be referred to as a scheme Y). Since the amounts of FEC data are identical in the schemes X and Y, the error tolerability imparted to the I and P frames in the scheme X is lower than that in the scheme Y.

Thus, according to the above arrangement in which the schemes X and Y are switched corresponding to the packet loss rate, the number of frames that can be reproduced in the reception terminal 200 can be increased greater than in the case where the schemes X and Y used independently of each other. For example, when the packet loss rate is low, since lost packets can be recovered even with a low error correction capability, the number of reproduction frames is relatively larger in the scheme X. On the other hand, however, according to the scheme X, when the packet loss rate is high, the number of I and P frames to be reproduced is small. As such, P and B frames for referencing these reproduction frames cannot be reproduced, and the number of reproduction frames sharply decreases. Unlike this case, according to the scheme Y, since the high error tolerability is imparted to the I and P frames, even when the packet loss rate is high, referenced frames (I and P frames) are not lost and, consequently, the number of reproduction frames is large.

Thus, description has been given regarding the case where I, P and B frames are referred to as targets. However, the case may be such that with hierarchical encoding being employed, base layers are used instead of the I and P frames, and extended layers are used instead of the B frames.

Figure 5:
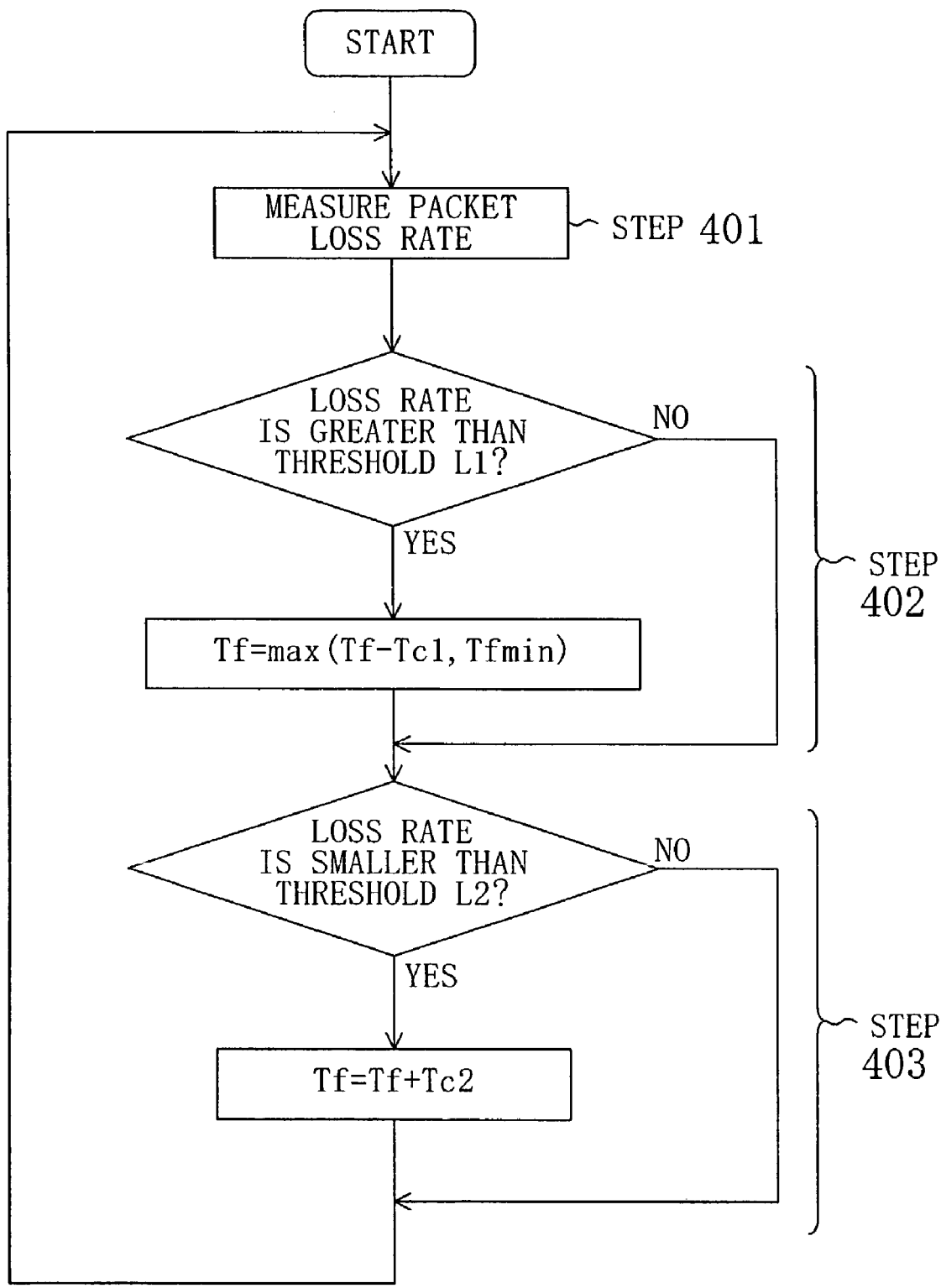
FIG. 5 is a flowchart showing main operations of a feedback information generation section and notification interval control section shown in FIG. 2.

FIG. 5 is a flowchart showing main operations of the feedback information generation section 205 and the notification interval control section 206, which are shown in FIG. 2. The feedback information generation section 205 measures the packet loss rate in cooperation with the transport section 201 (step 401). When the packet loss rate is higher than a threshold L1 (fixed value), the notification interval control section 206 reduces a notification interval Tf of feedback information to be shorter than the current notification interval by a fixed value Tc1 within a range not to be smaller than a minimum value Tfmin (step 402). This causes the transport rate Rs to quickly follow a usable transmission band, thereby enabling occurrences of packet loss events to lower. When the packet loss rate is lower than a threshold L2 (fixed value smaller than L1), the notification interval control section 206 increases the notification interval Tf of feedback information to be longer than the current notification interval by a fixed value Tc2 (step 403). This enables frequent switching operations for the transport rate to decrease, and further enables fairness with the other flows to be improved.

Figure 6:
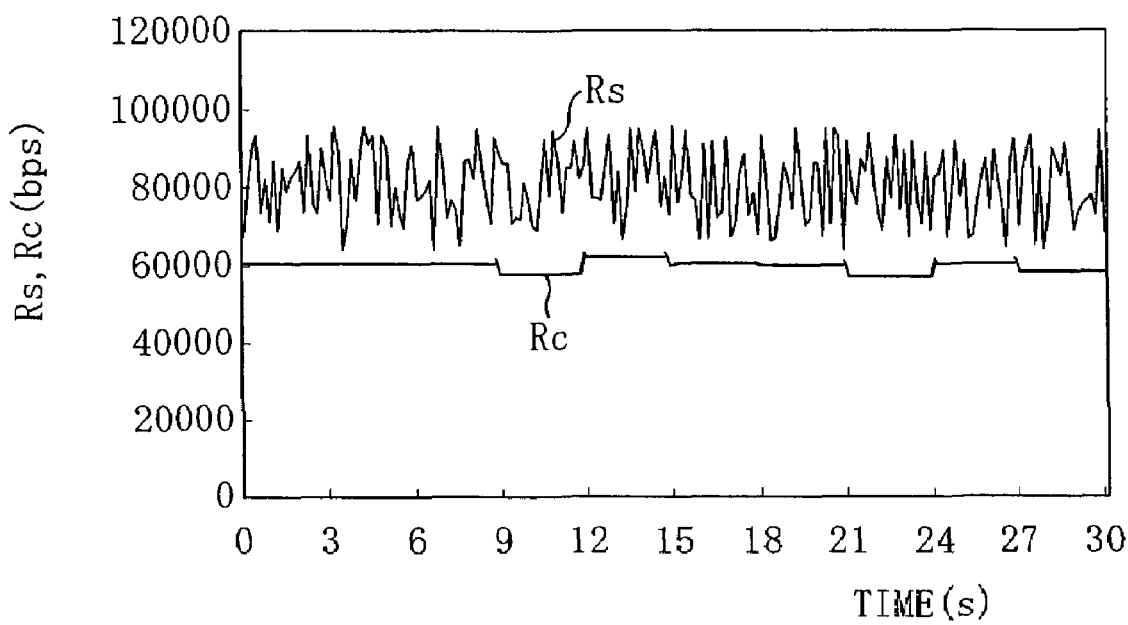
FIG. 6 is a timing chart showing variation examples of a transport rate and an encoding rate in media data transmissions by the devices shown in FIGS. 1 and 2.

FIG. 6 shows variation examples in the transport rate Rs and the encoding rate Rc in media data transmission by the transmission terminal 100 and reception terminal 200 shown in FIGS. 1 and 2, respectively. According to FIG. 6, even under a state where the transport rate Rs is frequently updated, the operation of the encoding rate/FEC data sending rate determination section 106 reduces the update frequency for the encoding rate Rc. In addition, when the packet loss rate is low, the notification interval control section 206 operates to reduce unnecessary updates of the transport rate Rs.

Figure 7:
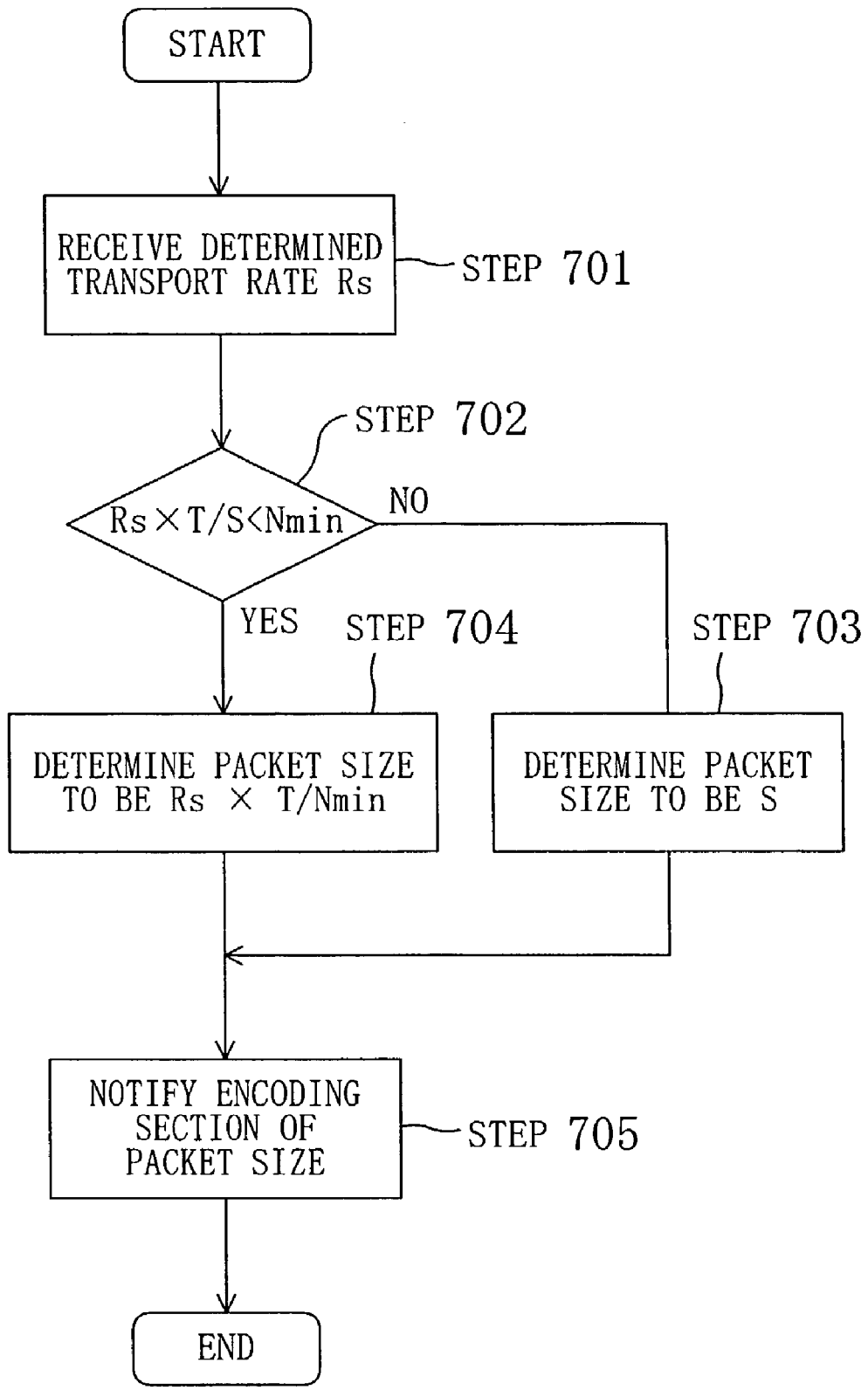
FIG. 7 is a flowchart showing an operation of a packet size determination section shown in FIG. 1.

FIG. 7 is a flowchart showing an operation of the packet size determination section 108 shown in FIG. 1. According to the operation shown in FIG. 7, when the transport rate Rs decreases, the packet loss rate can finely be observed in a manner that the data packet size is reduced.

First, the packet size determination section 108 receives a transport rate Rs determined by the transport rate determination section 105 (step 701). Then, with the letter S representing the packet size in a regular mode, the operation obtains a number N of packets transportable at the transport rate Rs during an observation period T, as follows:

$$N = Rs \times T/S.$$

Then, the packet size determination section 108 determines as to whether the value of the number N of packets is smaller than a threshold Nmin (step 702). As a result, when N is determined not to be smaller than Nmin, the regular-mode packet size S is employed (step 703). When N is determined smaller than Nmin, a packet size S' to be employed is calculated as follows (step 704):

$$S' = Rs \times T/Nmin.$$

Then, the packet size determination section 108 notifies the encoding section 102 of the packet size determined in step 703 or 704, and the procedure is finished.

As described with reference to FIG. 5, according to the embodiment of FIGS. 1 and 2, since the notification interval Tf of the feedback information varies, the observation period T varies, accordingly. However, using the minimum value Tfmin of the feedback information observation period enables at least the number Nmin of packets to be transmitted.

Figure 8:
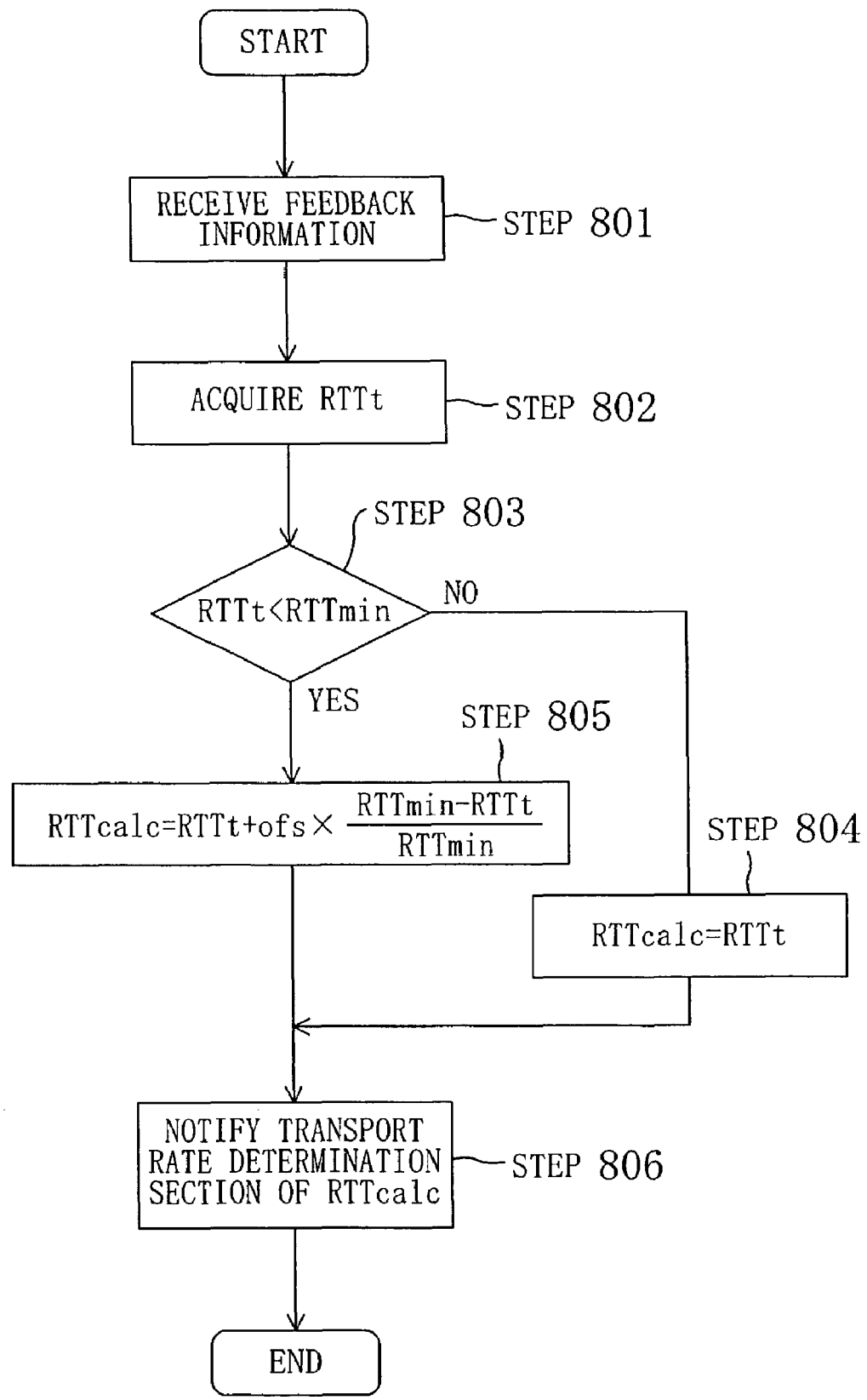
FIG. 8 is a flowchart showing an operation of an RTT calculation section shown in FIG. 1.

FIG. 8 shows an operation of the RTT calculation section 109 shown in FIG. 1. According to FIG. 8, an offset is added to the RTT, thereby enabling reduction to be implemented in fluctuation of the transport rate Rs, the fluctuation occurring in a delay irrelevant to a congestion state of the network 150.

First, the RTT calculation section 109 receives feedback information from the reception terminal 200 (step 801), then acquires a measured round trip propagation delay time RTTt from the feedback information (step 802). Subsequently, the RTT calculation section 109 determines as to whether the RTTt is smaller than a predetermined threshold RTTmin (step 803). When the RTTt is not smaller than the RTTmin, the RTTt is used as a round trip propagation delay time RTTcalc that is used for calculation of a transport rate Rs (step 804). When the RTTt is smaller than the RTTmin, the round trip propagation delay time RTTcalc used for the calculation is obtained using the following equation (step 805):

$$RTTcalc = RTTt + ofs \times (RTTmin - RTTt)/RTTmin$$

In the equation, ofc is a predetermined constant. Then, the RTT calculation section 109 notifies the transport rate determination section 105 of the RTTcalc determined in step 804 or 805 (step 806), and then the procedure is finished.

Figure 9:
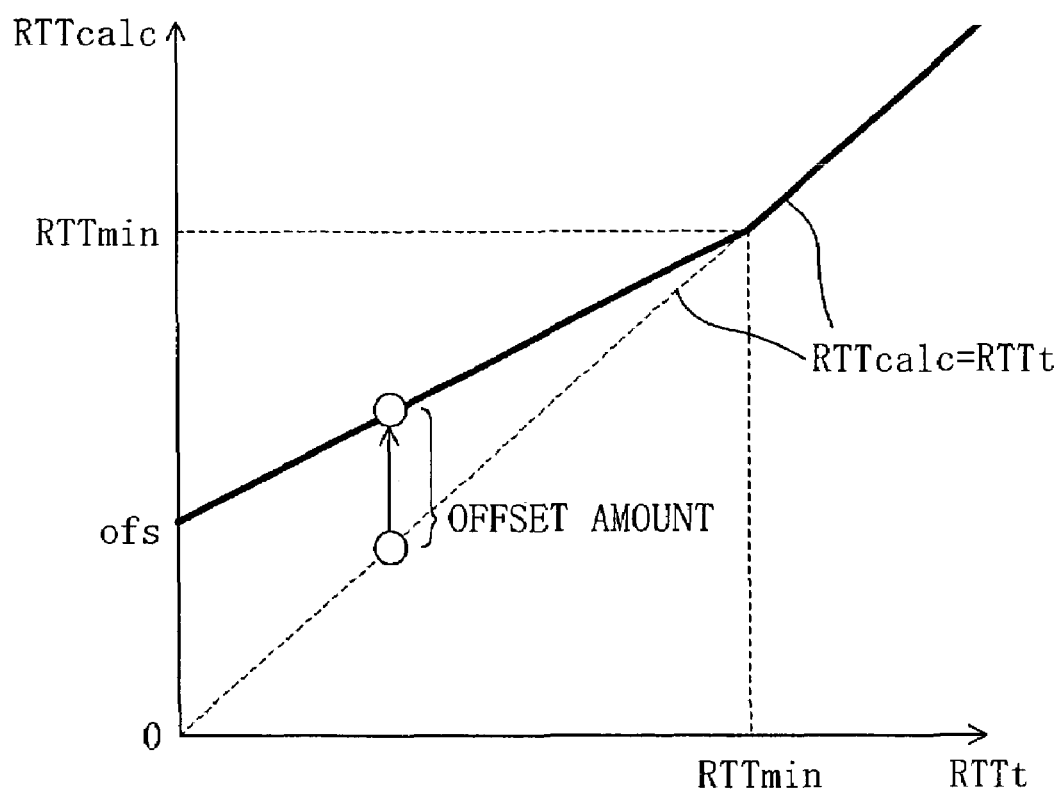
FIG. 9 is a graph for describing RTT offset addition implemented by the operation shown in FIG. 8.

FIG. 9 shows the relationship between the RTTt and the RTTcalc described above. In FIG. 9, the horizontal axis indicates the RTTt, and the vertical axis indicates the RTTcalc. The relationship between the RTTt and the RTTcalc is represented by the thick solid polyline. The broken line represents a case where RTTcalc=RTTt; that is, the measured RTT is used as it is for the calculation. As shown in FIG. 9, a positive addition offset is used when the RTTt is smaller than the RTTmin. As such, no case occurs in which the RTTcalc is excessively small even when the RTTt is small.

The increase in the congestion-dependent propagation delay is several hundreds of milliseconds or greater, and the processing delay of a device is on the order of several milliseconds. As such, with the value such as the above-described RTTmin or ofs being set to a value on the order of several tens of milliseconds or less, no event occurs in which the addition offset influences the propagation delay time when congestion has occurred.

The transport protocol between the transmission terminal 100 and the reception terminal 200 may be a unique protocol instead of IP. In addition, the connection is not limited to be of the one-to-one type, and may be of a one-to-N broadcast, multicast type; or it may be of an N-to-M mesh type. Media data may either be transmitted alone or be parallel transmitted in synchronization. Further, not only the standardized encoding method, but also a different unique encoding method may be used.

What is claimed is:

1. A method for transporting encoded data based on media data via a network, comprising:
    a first step of updating a transport rate in accordance with a transport state of the network; and
    a second step of checking whether the transport rate Rs is within a variable range in which the transport rate Rs is greater than an encoding rate Rc and smaller than predetermined times the encoding rate Rc and when the transport rate Rs is not within the variable range, updating the encoding rate Rc using a value obtained by multiplying the transport rate Rs out of the variable range by a predetermined value and generating encoding data from the media data based on the encoding rate.

2. The method according to claim 1, further comprising:
    a third step of allocating a difference between the transport rate and the encoding rate to a sending rate for redundant data used for error correction, adding the redundant data to the encoded data, and transmitting the resulting data.

3. The method according to claim 2,
    wherein the third step includes a step of changing an error correction scheme in accordance with the sending rate of the redundant data.

4. The method according to claim 2,
    wherein the third step includes a step of changing the error correction scheme in accordance with a packet loss rate of the network.

5. The method according to claim 4,
    wherein the third step includes a step of imparting an error tolerability to all encoded data when the packet loss rate of the network is low, and imparting the error tolerability only to encoded data having a high importance when the packet loss rate of the network is high.

6. The method according to claim 1,
    wherein the first step includes a step of notifying of feedback information indicative of a transport state of the network from a reception terminal.

7. The method according to claim 6, further comprising:
    a step of variably controlling a notification interval for the feedback information in accordance with the transport state of the network.

8. A media transmitter for transmitting encoded data based on media data to a network, comprising:
    means for generating the encoded data from the media data:
    means for generating redundant data for error correction from the encoded data;
    means for updating a transport rate in accordance with a transport state of the network;
    means for checking whether the transport rate is within a variable range in which the transport rate is greater than an encoding rate and smaller than a first predetermined value times the encoding rate and when the transport rate is not within the variable range, updating the encoding rate using a value obtained by multiplying the transport rate out of the variable range by a second predetermined value;
    means for allocating a difference between the transport rate and the encoding rate to a sending rate for the redundant data; and
    means for adding the redundant data to the encoded data and transmitting the resulting data.

* * * * *